(12) United States Patent
Henshaw

(10) Patent No.: US 6,476,405 B1
(45) Date of Patent: Nov. 5, 2002

(54) MEASUREMENT APPARATUS HAVING A DIFFRACTION GRATING STRUCTURE

(75) Inventor: James R Henshaw, Stroud (GB)

(73) Assignee: Renishaw PLC, Gloucestershire (GB)

( * ) Notice: Subject to any disclaimer, the term of this patent is extended or adjusted under 35 U.S.C. 154(b) by 138 days.

(21) Appl. No.: 09/714,529

(22) Filed: Nov. 17, 2000

(30) Foreign Application Priority Data

Dec. 3, 1999 (GB) .............................................. 9928483

(51) Int. Cl.⁷ .............................................. G01N 21/86
(52) U.S. Cl. .............................. 250/559.29; 250/237 G
(58) Field of Search .................... 250/237 G, 559.29, 250/548, 559.3; 356/450, 498, 509, 399–401, 616, 617, 620

(56) References Cited

U.S. PATENT DOCUMENTS

| 4,926,566 A | 5/1990 | McMurtry et al. |
| 4,974,962 A | 12/1990 | Stephens et al. |
| 5,204,524 A | 4/1993 | Ichikawa et al. |
| 5,302,820 A | 4/1994 | Henshaw et al. |
| 5,559,601 A | 9/1996 | Gallatin et al. |
| 5,576,537 A | 11/1996 | Holzapfel et al. |
| 5,886,352 A | * 3/1999 | Wright et al. .......... 250/231.14 |

FOREIGN PATENT DOCUMENTS

| DE | A 24 01 475 | 7/1975 |
| EP | 0 207 121 | 1/1987 |
| GB | 1485584 | 9/1977 |
| WO | WO 86/03833 | 7/1986 |

* cited by examiner

Primary Examiner—Que T. Le
(74) Attorney, Agent, or Firm—Oliff & Berridge, PLC

(57) ABSTRACT

A scale and scale reader are disclosed for measuring displacement in two directions. One embodiment of the scale shows a chequered pattern forming a matrix of marks for providing a light pattern to a diffraction grating. The diffraction grating has a similar chequered pattern and provides an interference light pattern to a photodetector array. The interference pattern enables the detector to determine movement in each of the two directions.

6 Claims, 4 Drawing Sheets

MEASUREMENT APPARATUS HAVING A DIFFRACTION GRATING STRUCTURE

FIELD OF THE INVENTION

The present invention relates to an opto-electronic scale reading apparatus and scale therefor, forming two-direction measurement apparatus.

DESCRIPTION OF THE PRIOR ART

A known form of opto-electronic scale reading apparatus for measuring relative displacement of two members comprises a scale on one of the members, having scale marks forming a periodic pattern, a read head provided on the other member, means for illuminating the scale, periodic diffraction means for interacting with light from the scale marks to produce interference fringes having movement relative to the read head and detecting means in the read head responsive to the fringes to produce a measure of the displacement.

An example of such apparatus is disclosed in EP-A-0 207 121 and also U.S. Pat. No. 4,974,962, each of which shows the means for illuminating and the periodic diffraction means in the read head. U.S. Pat. No. 4,926,566 discloses a method of producing a scale, in the form of a flexible tape produced by rolling, the pitch of the scale marks being 20 $\mu$m or 40 $\mu$m for example. The illuminating means, the diffraction means and the detecting means responsive to the fringes may be integrated in the read head in the manner described in U.S. Pat. No. 5,302,820.

However, in the above basically only displacement in one linear direction may be measured. One way to measure displacement in two orthogonal linear directions is to use two read heads in one body at right angles to one another. However, measurement errors, particularly Abbé errors, can result from the necessary spacing between the two read heads. Such an arrangement may also be expensive or not compact.

Another known form of opto-electronic scale reading apparatus is disclosed in U.S. Pat. No. 5,204,524. The scale comprises a diffraction grating co-operating with at least one other grating on a read head to produce interference fringes, some or all of which move relative to the read head during a displacement of the read head relative to the scale and the measurement is a count of such fringes. Such a scale has to be of diffraction quality, and the accuracy and reliability of the measurement depends on such parameters as the regularity of the spacing of the scale marks, the sharp definition of the edges of the marks and the freedom of the scale from scratches and like imperfections. Such a scale can be expensive to produce and protect especially when the scale has to be relatively large.

It is also known to increase the number of signals obtainable from any two adjacent marks of the scale by phase quadrature interpolation and known scale-reading apparatus can be subject to phase errors.

In each of U.S. Pat. No. 5,204,524 and U.S. Pat. No. 5,576,537 there is shown apparatus for measuring displacement in each of two directions between two members wherein use is made of a scale capable of producing diffracted orders. Such a scale must necessarily have marks which have a single periodicity in each of the two directions and there is no indication of the presence of secondary periodicities defining departures from a single periodicity in each of the two directions, or of a spatial filter having a pass band defining a maximum such departure.

SUMMARY OF THE INVENTION

According to the present invention, there is provided measurement apparatus comprising a scale extending in two directions and scale reader apparatus for determining displacement during relative movement between the scale and the scale reader apparatus in each of the two directions, the scale comprising a matrix pattern having periodicity in the two directions, the scale reader apparatus comprising a scale illuminator, a diffraction grating structure and a light detector, in use the illuminator acting to illuminate the scale, the grating structure causing light from the scale to be formed into an interference pattern having light of varying intensity and the detector acting to detect the interference pattern and produce an indication of the displacement in each of the two directions, wherein the grating structure provides a grating in one of the two directions interlaced within a grating in the other of the two directions.

BRIEF DESCRIPTION OF THE DRAWINGS

The present invention will now be described, with reference to the accompanying drawings wherein.

DESCRIPTION OF THE PREFERRED EMBODIMENTS

In the following embodiments of this invention, the diffraction mechanism takes place wholly within the read head. The scale is required merely to provide a pattern of light sources. The scale is not required to be a diffraction grating and the marks on the scale do not have to be of diffraction quality. The read head performs an optical convolution, i.e. the interference pattern generated in the plane of the detector array is a convolution of the scale with a pattern which is substantially sinusoidal in the directions of measurement. This makes the read head substantially free from phase quadrature errors.

The two directions in which the embodiments principally measure displacement are hereinafter referred to as the "X" and "Y" directions, although orthogonality between the X and Y directions is illustrated, the invention is not restricted so.

Figure 1:
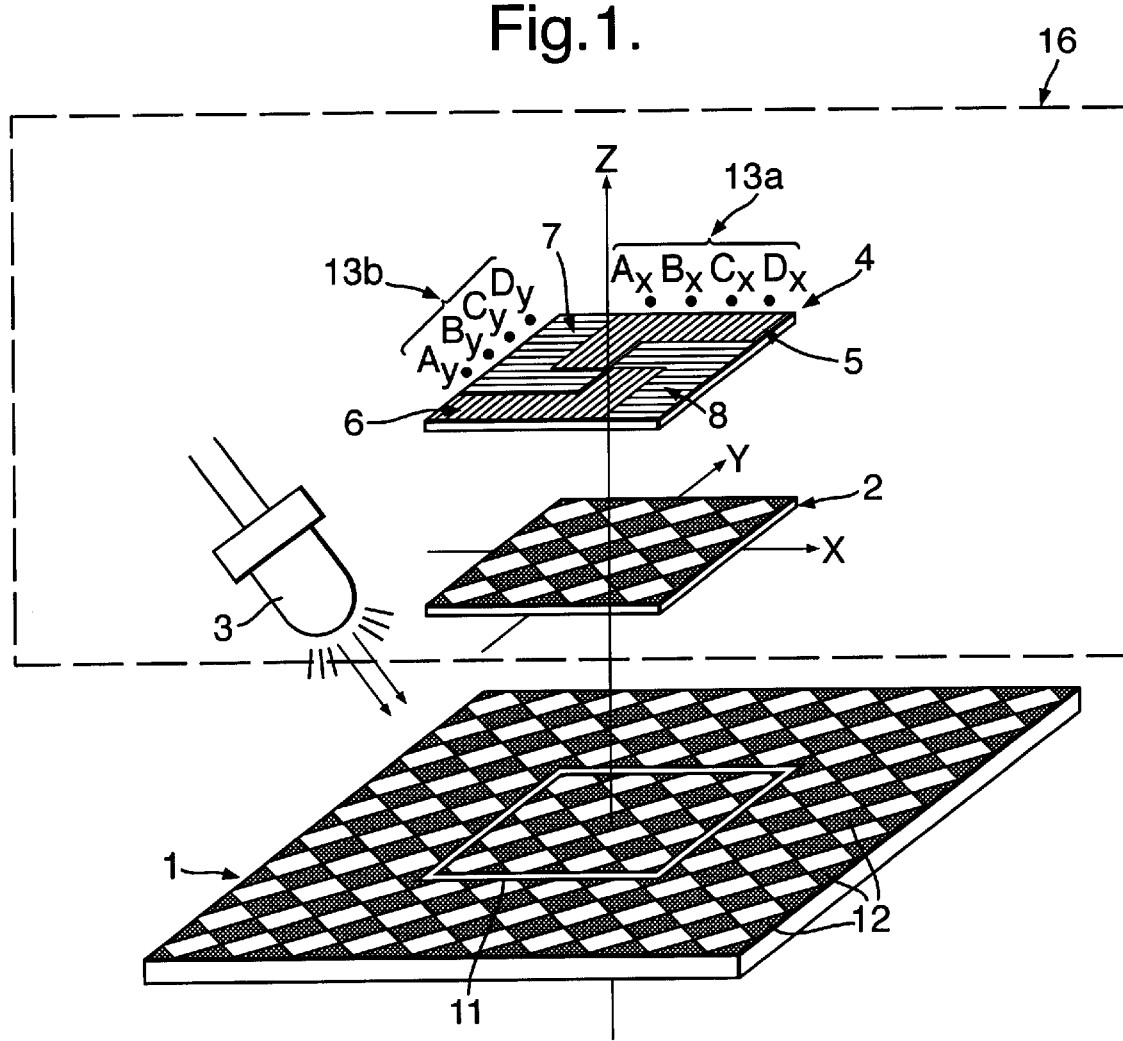
FIG. 1 is a view of an embodiment of apparatus according to the invention.

Referring to FIG. 1, reference numeral 1 designates an X-Y scale for attachment to a member whose displacement is to be measured in the X and Y directions. Scale 1 comprises a matrix of marks defining a pattern with periodicity in the X and Y directions. Reference numeral 2 designates a two-dimensional diffraction grating providing a grating in the X direction interlaced with a grating in the Y direction for interacting with light reflected from the scale 1, the latter being illuminated by a light-emissive diode (LED) source 3.

Inside a read head 16 (which by way of example also includes the grating 2 and the LED 3), is a two-dimensional array of silicon photo-detectors. More particularly, but by way of example only, array 4 comprises sets 5 and 6, each of strips of photo-detectors aligned in the Y direction, and sets 7 and 8, each of strips of photo-detectors aligned in the X direction.

In use of the apparatus, by virtue of the two-dimensional matrix structure of scale 1 and the two-dimensional grating 2, in contrast to conventional linear encoders where fringes are produced, spots of light at the array 4 are produced as a result of the diffraction process. As scale 1 moves relative to the read head, movement of the spots in the X direction is detected by the photo-detectors of the sets 5 and 6 to produce measurement signals (13a) $A_X$, $B_X$, $C_X$, $D_X$ . . . and the movement of the spots in the Y direction is detected by the photo-detectors of the sets 7 and 8 to produce measurement signals (13b) $A_Y$, $B_Y$, $C_Y$, $D_Y$ . . . .

Figure 2:
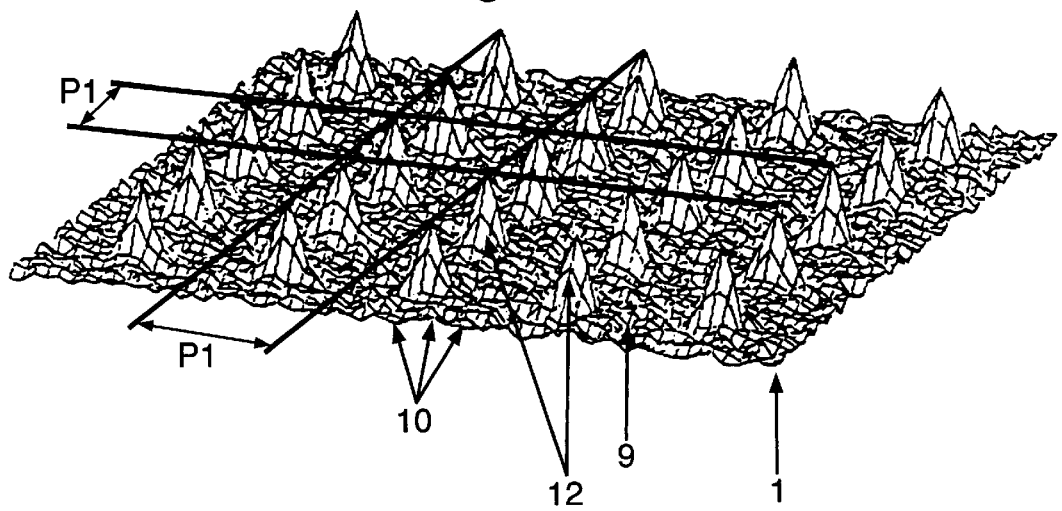
FIG. 2 is a representation of the scale of FIG. 1.

The scale 1 is typically a plate with periodic marks in the X and Y directions. The marks may be defined by a single periodicity P1 in each of the X and Y directions, or several periodicities, forming a band, the "scale band". The scale band includes the dominant periodicity P1 among a range of secondary periodicities, which may be produced by random variations in the periods of the marks. FIG. 2 shows the intensity profile 9 of such a scale 1, including such random variations represented as randomly distributed reflective regions 10. The structure includes regions 12 with period P1 in both the X and Y directions. This scale profile may be more economical to produce than a scale with only a single periodicity in each direction. The apparatus includes a filter consisting of the grating 2 and by a sampling region 11 spanning a portion of the area of the scale. P1 lies within the pass band of the filter. The filter responds to the light pattern produced by the scale 1 and acts on the detector array 4 to produce the signals 13a and 13b.

Figure 3:
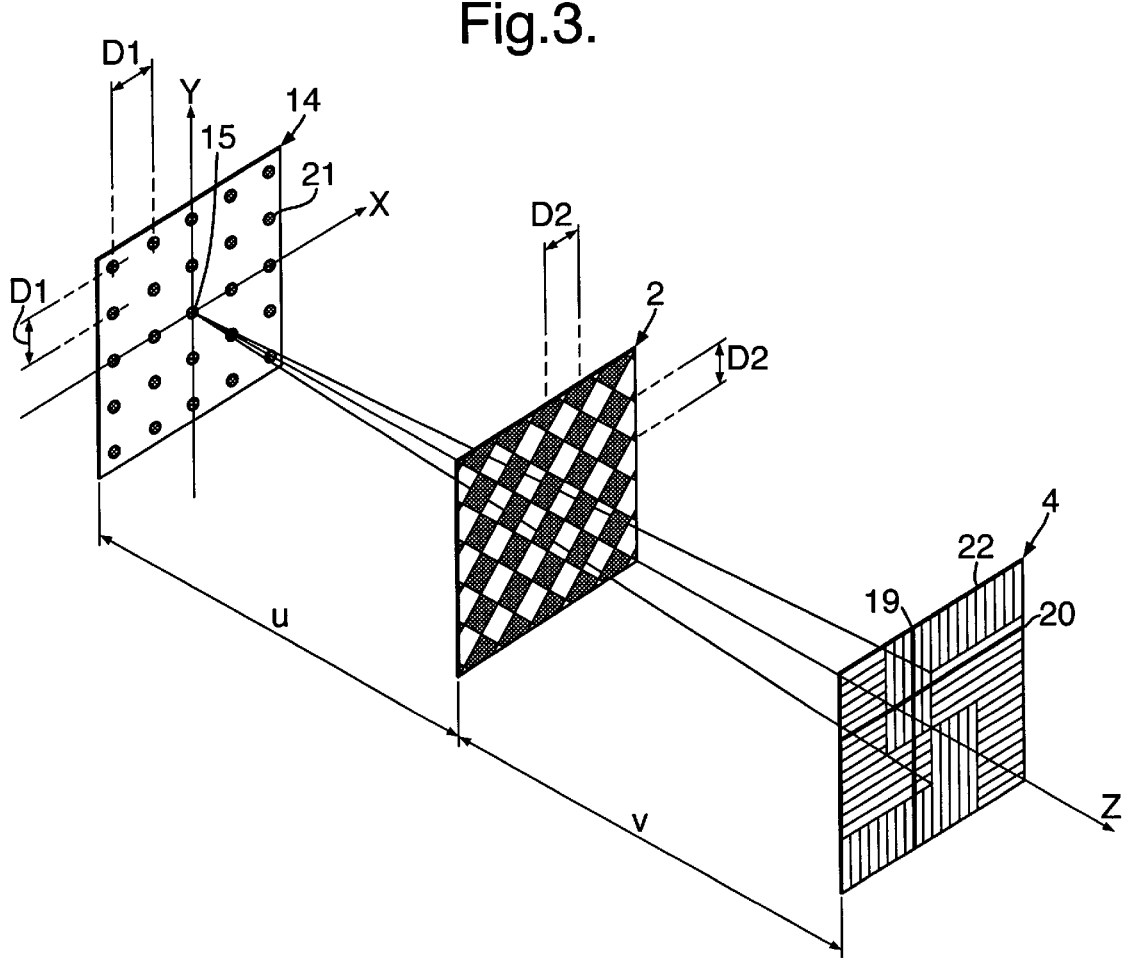
FIG. 3 is a diagram showing the optical layout and operation of the apparatus.

The regions 10 and 12 define the intensity distribution of the scale. Referring to FIG. 3, the grating 2 may be an amplitude grating, typically a Ronchi grating, having periodicity in both the X and Y directions. Within the field of "Fourier imaging", the phenomenon of "self-imaging" of periodic masks is used.

In the first embodiment, this phenomenon requires for these types of grating that the following expressions are satisfied:

$$1/u+1/v=\lambda/(n \times D2^2) \quad (1)$$

$$D2/D3=u/(u+v) \quad (2)$$

$$D2/D1=v/(u+v) \quad (3)$$

wherein:
u=the distance between a generating plane 14 and the grating 2;
v=the distance between the grating 2 and the detector array 4;
λ=the wavelength of the light;
D1=the pitch in both the X and Y directions of a plurality of said point sources lying in the plane 14 and co-operating to form the interference pattern;
D2=the pitch in both the X and Y directions of the grating 2;
D3=the pitch in both the X and Y directions of the elements 5, 6, 7 and 8 of the detector array 4;
n=a positive integer.
Note that P1, D1, D2 and D3 may have different values in the X and Y directions. They should more correctly be referred to as $P1_X$, $P1_Y$, $D1_X$, $D1_Y$, $D2_X$, D2Y, $D3_X$ and $D3_Y$. However, for simplicity of explanation only, it is assumed that:

$$P1=P1_X=P1_Y$$

$$D1=D1_X=D1_Y$$

$$D2=D2_X=D2_Y$$

and $$D3=D3_X=D3_Y$$

Figure 4:
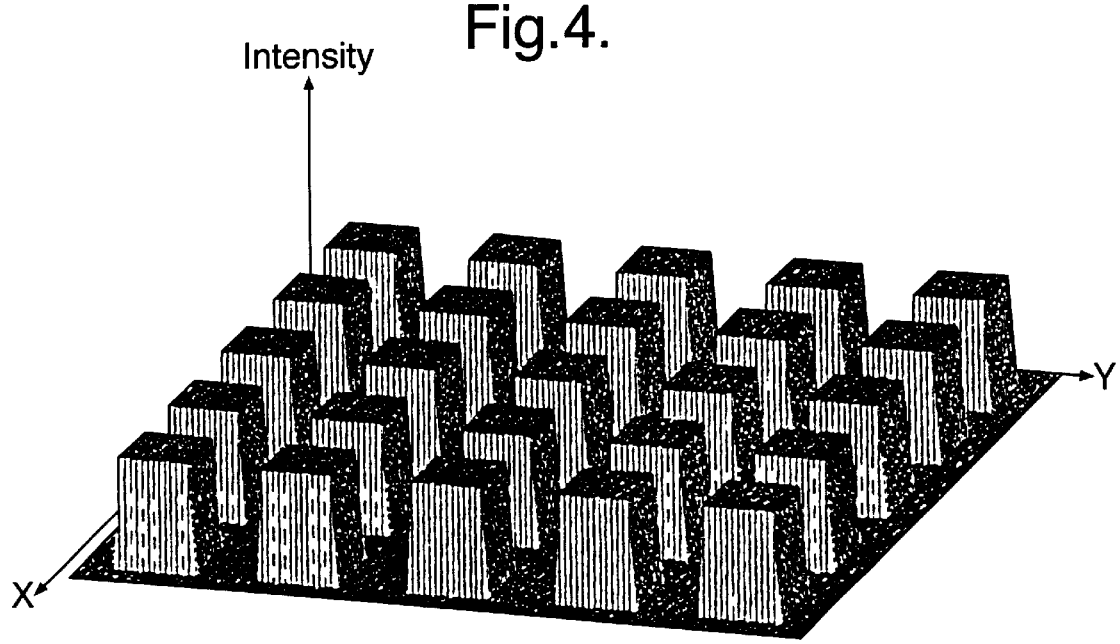
FIG. 4 is a representation of the interference pattern formed by part of the apparatus of the first embodiment.

The plane 14 lies in the XY directions and contains a notional point source 15 of substantially monochromatic light. This arrangement produces an interference pattern (FIG. 4) substantially similar in pattern to grating 2, this interference pattern being a self-image of the grating.

The head 16 and the scale 1 are matched by making the pitch D1 of the read head equal to the pitch P1 of the scale. The head is positioned relative to the scale so that the scale 1 is substantially coincident with the generating plane 14. Notional light sources 21 (FIG. 4) are then the actual sources defined by the light reflected from surface features of the scale.

During relative movement of the head 16 and the scale 1, the resulting movement of the notional light sources 21 in the generating plane 14 in the direction X produces a corresponding movement of the interference pattern (FIG. 4) in the direction X, relative to the read head 16 and the resulting movement of the notional light sources in the direction Y produces a corresponding movement of the interference pattern in the direction Y relative to the read head. If u and v are equal, the amount of movement of the interference pattern relative to the read head is the same as that of the relative movement of the head and the scale. A hypothetical line sensor 19 parallel to the Y direction and situated in the plane 22 of the interference pattern will detect fluctuations in light intensity as the interference pattern passes across it with some component of movement in the X direction and a hypothetical line sensor 20 parallel to the X direction and situated in the same plane will detect fluctuations in light intensity as the interference pattern moves across it with some component of movement in the Y direction. The detector array 4 has areas 5 and 6 with a pitch D3 in the X direction equal to the pitch of the periodicity of the interference pattern in the X direction and areas 7 and 8 with a pitch D3 in the Y direction equal to the pitch of the periodicity of the interference pattern in the Y direction. It is arranged that the plane of the detector array 4 coincides with the plane 22 of the interference pattern.

In the second embodiment the parameters of the head are given by:

$$1/u+1/v=\lambda/[(n+\tfrac{1}{2}) \times D2^2] \quad (4)$$

$$D2/D3=2u/(u+v) \quad (5)$$

$$D2/D1=2v/(u+v) \quad (6)$$

Figure 5:
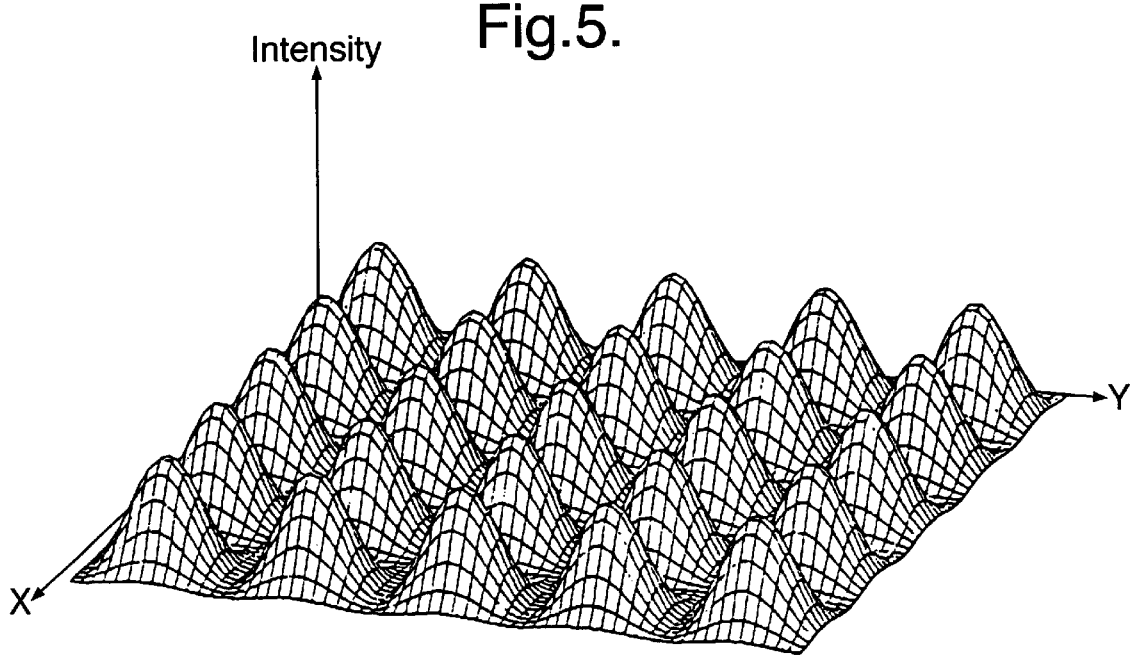
FIG. 5 is a representation of the interference pattern formed by part of the apparatus of a second embodiment according to the present invention.

The restriction of equation (1) does not apply at all in this case. However, equation (4) should be applied when n is low and/or the light is sufficiently monochromatic. Otherwise, the contrast of the interference pattern is substantially independent of wavelength and broad-band light, e.g. white light, may be used. In this embodiment, the pitch of the periodicity of the interference pattern (FIG. 5) that is formed is dependent only on the ratio u/v and not on the absolute values of u and v. There is some loss of interference pattern contrast in this case, but this is overcome by using a phase grating for the grating 2. Generally, this embodiment would be the preferred embodiment of this invention.

The pitch D1 is also referred to as the "nominal periodicity" of the filter, and the filter may be said to be tuned to read only those marks 12 of the scale 1 which have the nominal periodicity of the filter or lie within the pass band of the filter.

A housing supports the grating 2 and the detector array 4 at the spacing v and a support means supports the housing relative to the scale 1 at the distance u between the scale 1 and the grating 2.

It can be shown on the basis of Fourier theory that an optical convolution is performed between the scale pattern 10 and the interference pattern (FIG. 5) due to a single light source 15 illuminating the grating 2. Since sections through the interference pattern parallel to the X direction and sections through the interference pattern parallel to the Y direction are substantially sinusoidal, this convolution is a spatial filtering of the light distribution of the scale in favour of the spatial periodicity in the X and Y directions of the interference pattern. In other words, the head 16 is a tuned spatial filter.

The filtering action is strengthened in this case by a second convolution between the interference pattern (FIG. 5) and the detector array 4.

The convolutional character of the read head 16 causes it to be substantially independent of angular misalignment with respect to the scale 1, particularly about the Z axis. The read head is thus substantially immune to quadrature phase error caused by angular misalignment since the grating 2 and the detector array 4 are fixed one relative to another and the interference pattern (FIG. 5) has a fixed alignment with the lines of the grating 2. Therefore, the head 16 can be set up, relative to the scale, by simple mechanical methods, such as setting gauges and it is not normally necessary, during setting up, to monitor the phase of the signals 13 and make adjustments in the head position to eliminate phase errors as between the respective signals 13.

The spatial filter is designed to pass some scale periodicites but not others. The periodicities which are passed by the filter constitute two bands (hereinafter the filter bands) FBx and FBy (FIG. 6) of periodicities, one such band FBx being in the X direction and the other band FBy being in the Y direction. The "X" filter band and the "Y" filter band may be determined separately by at least one of the following:

the illuminated or sampling region 11 of the scale 1 (FIG. 1);

the optical aperture of the grating 2;

the optical aperture of the detector array 4;

the structure of the grating 2;

the structure of the detector elements 5,6,7 and 8;

the wavelength and spectral bandwidth of the light;

the degree to which the scale 1 scatters the light as opposed to reflecting it specularly;

the position, extent and divergence of the source 3.

Depending on the geometry of the filter, one of these constraints may dominate over the others, or more than one may act together to set the filter bandwidths. The constraint or constraints setting the filter bandwidth in the X direction need not necessarily be the same as the constraint or constraints setting the filter bandwidth in the Y direction. Any of these constraints may be used to set the size of the filter band in each direction.

The region 11 may be illuminated over an area smaller in X or Y or both dimensions than an area corresponding to the greatest possible aperture of the grating 2 in which case the effective aperture is smaller than said greatest possible aperture. In practice, given that the scale has the periodicity P1 in each of the X and Y directions, the filter F is designed to match the periodicity P1. To cope with a given tolerance in the actual periodicity of the scale, i.e. in the spacing of the marks 12, due to manufacturing tolerances, the pass band of the filter is made sufficiently wide to include that tolerance. However, the dominant scale periodicity P1 needs to be detectably present on the scale in the sense of lying within said sampling region 11 in both X and Y directions and within the pass band of the filter in both X and Y directions.

Figure 6:
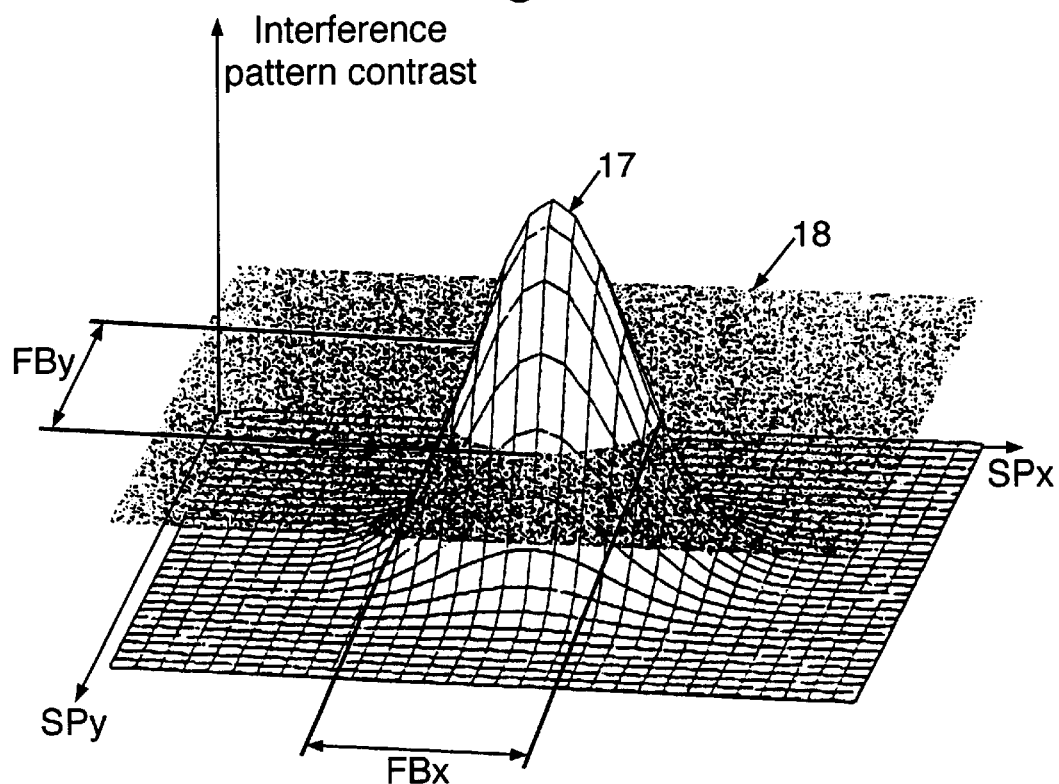
FIG. 6 is a diagram showing the response of a filter.

FIG. 6 is a diagram showing the pass bands FBx and FBy of the filter. The surface 17 represents the whole response of the filter in terms of the contrast of the interference pattern (FIG. 5) for different scale periodicities SPx and SPy. An interference pattern contrast above a plane 18 is sufficient to produce signals 13a and 13b (FIG. 1).

For simplicity of explanation only, it is now assumed that FBx=FBy=FB and SPx=SPy=SP.

So long as the periodicity P1 lies within the band FB in the X and Y directions, the filter can respond to it and produce a signal of acceptable amplitude. While being substantially uniform within the sampling region, P1 may vary over the extent of the scale 1. So long as P1 varies in such a way that within the sampling region, wherever this may be with respect to the scale, P1 always lies within the filter band FB an acceptable signal 13 will be produced. The filter responds in sympathy with any such changes in the periodicity.

This is acceptable for a given error tolerance. However, the arrangement has the advantage of relatively good freedom from quadrature phase error. In a typical example, the nominal periodicity in the X and Y directions is 20 $\mu$m and the width of the pass band is 0.1 $\mu$m in each direction for a sample region 11 of 10 mm square. If P1 varies over a range of 0.05 $\mu$m, the error tolerance would have to be 2.5 mm per m. However, as little phase quadrature error is introduced, this can be compensated for and reduced, typically to 20 $\mu$m per m.

Figure 7:
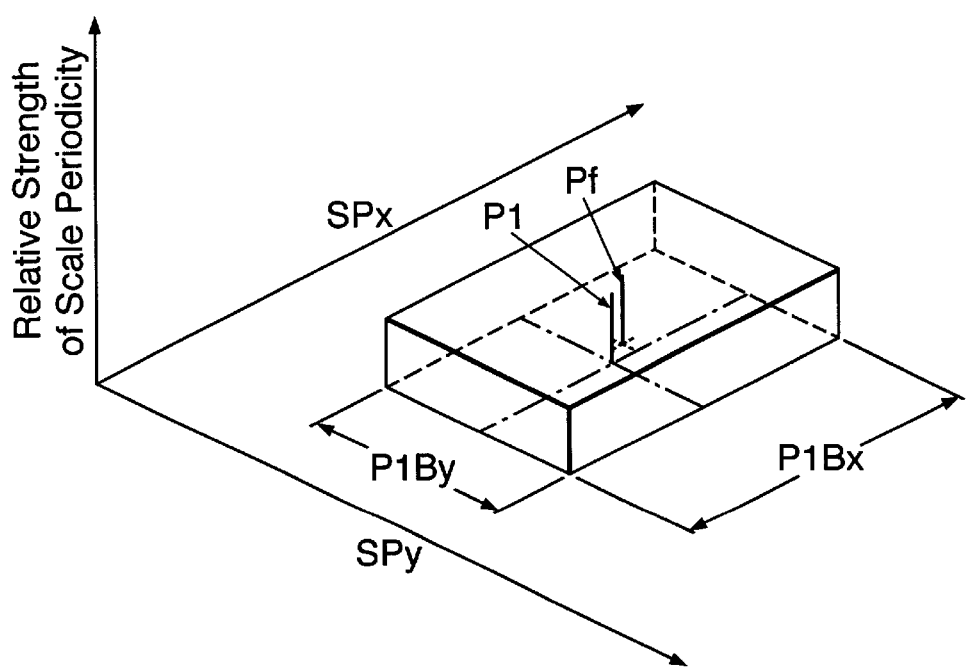
FIG. 7 is a diagram showing a band of scale periodicities.

FIG. 7 shows a band of scale periodicities (PB1x, PB1y) present within the sampling region 11 and including the dominant periodicity P1 within the band in both the X and Y directions. If the dominant periodicity coincides with the nominal periodicity of the filter, the filter response is in accordance with the nominal periodicity. If as shown in FIG. 7, the dominant periodicity P1 does not coincide with the nominal filter periodicity Pf, then the filter response is in accordance with the dominant periodicity P1. So long as P1 lies within the filter band, an acceptable signal 13 is produced.

The scale 1 may be a flat plane or a curved surface. It may be continuous in one or more directions, for example, as a band or cylinder.

A second diffraction grating may be used between the grating 2 and the detector array 4 to match the pitch of the interference pattern to the pitch of the detector array, for example by making use of Moiré effects.

The grating 2 may be a phase grating or a Ronchi grating.

The grating 2 and/or the detector array 4 may be tilted by rotation about an axis in a plane containing the X and Y directions in order to increase the tolerance of the read head to misalignment with respect to the scale, particularly to increase the tolerance on distance u.

The patterns of marks illustrated for the scale and grating are chequered but other regular patterns would give satisfactory results e.g. rows of circles. It will be noted that the orientation of the squares of the chequered pattern is diagonal to the X and Y directions shown. Thus movement in X or Y by the readhead results in an overall dark then not dark photodetection during the "diagonal" movement. However the same effect would not happen if the X and Y directions were aligned with the sides of the squares of the chequered pattern.

What is claimed is:

1. Measurement apparatus comprising a scale extending in two directions and scale reader apparatus for determining displacement during relative movement between the scale and the scale reader apparatus in each of the two directions, the scale comprising a matrix pattern having periodicity in the two directions, the scale reader apparatus comprising a scale illuminator, a diffraction grating structure and a light detector, in use the illuminator acting to illuminate the scale, the grating structure causing light from the scale to be formed into an interference pattern having light of varying intensity and the detector acting to detect the interference pattern and produce an indication of the displacement in each of the two directions, wherein the grating structure provides a grating in one of the two directions interlaced within a grating in the other of the two directions.

2. Measurement apparatus as claimed in claim 1 wherein the interlaced gratings of the grating structure are formed as a matrix pattern having periodicity in the two directions.

3. Measurement apparatus as claimed in claim 2 wherein the matrix patterns of the scale and grating are each formed as a chequered pattern.

4. Measurement apparatus as claimed in claim 1 wherein the scale reader apparatus is in the form of a readhead and the scale illuminator, grating structure and light detector are within the readhead.

5. Measurement apparatus as claimed in claim 1 wherein the light detector is an array of photodetectors arranged in a plurality of sets each set having a plurality of strips of photodetectors being aligned in one of the two directions.

6. Measurement apparatus as claimed in claim 5 wherein the sets are "L" shaped and are fitted together.

* * * * *